United States Patent [19]

Ackermann et al.

[11] 4,207,065

[45] Jun. 10, 1980

[54] DEVICE FOR HEATING OPEN MELTING BATHS, SUCH AS GALVANIZING BATHS, ENAMELING BATHS, LEAD COATING BATHS, METALLIC BATHS, GLASS BATHS, AND THE LIKE

[75] Inventors: Werner Ackermann, Siegen-Trupbach; Frohmut Vollhardt, Siegen-Bürbach, both of Fed. Rep. of Germany

[73] Assignee: SAG Siegener AG, Siegen-Geisweid, Fed. Rep. of Germany

[21] Appl. No.: 31,167

[22] Filed: Apr. 18, 1979

[30] Foreign Application Priority Data

Apr. 19, 1978 [DE] Fed. Rep. of Germany ....... 2817006

[51] Int. Cl.² ............................. F27B 3/00; F26B 3/00
[52] U.S. Cl. .................................... 432/195; 432/210; 110/238; 13/6; 65/346
[58] Field of Search .................... 432/29, 23, 156, 161, 432/195, 198, 200, 210, 263, 248, 249; 110/238; 13/6; 65/346

[56] References Cited

U.S. PATENT DOCUMENTS

| 3,198,503 | 8/1965 | Eichelberg et al. ................. 432/198 |
| 3,897,202 | 7/1975 | Ackermann et al. ................. 432/195 |

Primary Examiner—Henry C. Yuen
Attorney, Agent, or Firm—Becker & Becker, Inc.

[57] ABSTRACT

A device for heating open melting baths, especially galvanizing baths, enameling baths, lead coating baths, metal baths, and glass baths, and the like, in tubs, or vats or tanks, wherein an inert gas is circulated through components of the open bath which are closed toward the gas side, and through a heater, whereby the tub, or vat or tank includes at each longitudinal and/or end wall a plurality of conduit means, such as pipes, for introduction of the gas into the bath and whereby the gas is withdrawn above the conduit means through a draft flue at the edge of the tub, or vat or tank, which draft flue includes a vertical partition immersed in the bath. The device includes means for communicating a warm gas receiving means with the container for the melting bath which communicating means includes at least one ceramic block including passage means for communicating the warm gas receiving means with the container.

16 Claims, 12 Drawing Figures

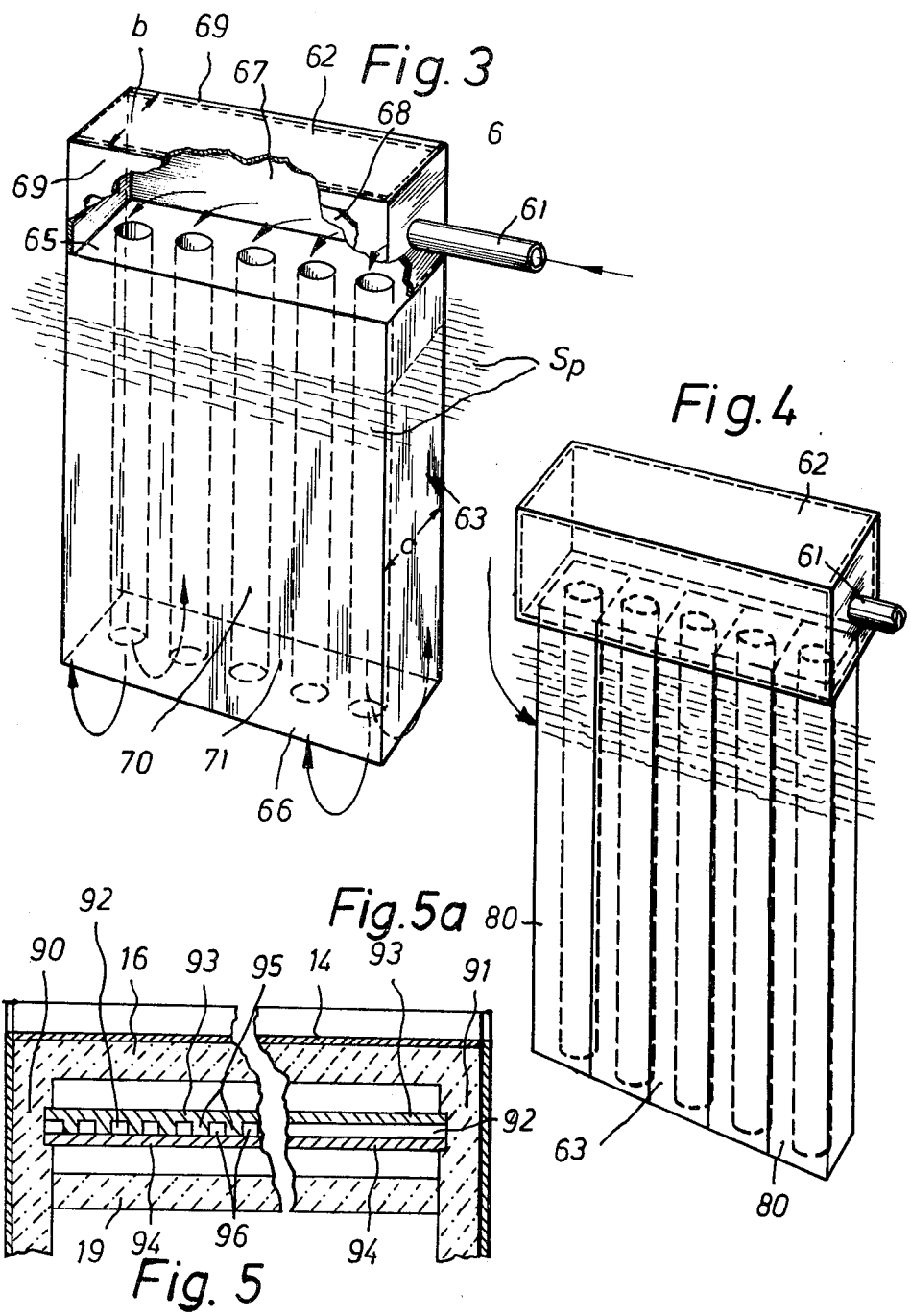

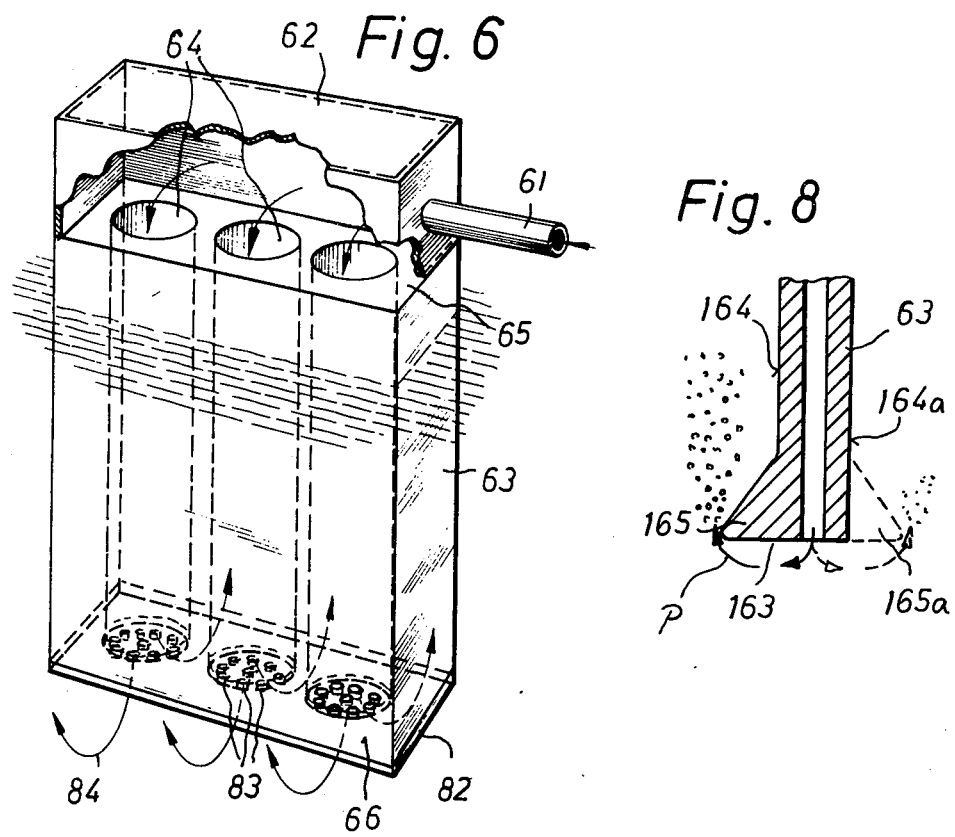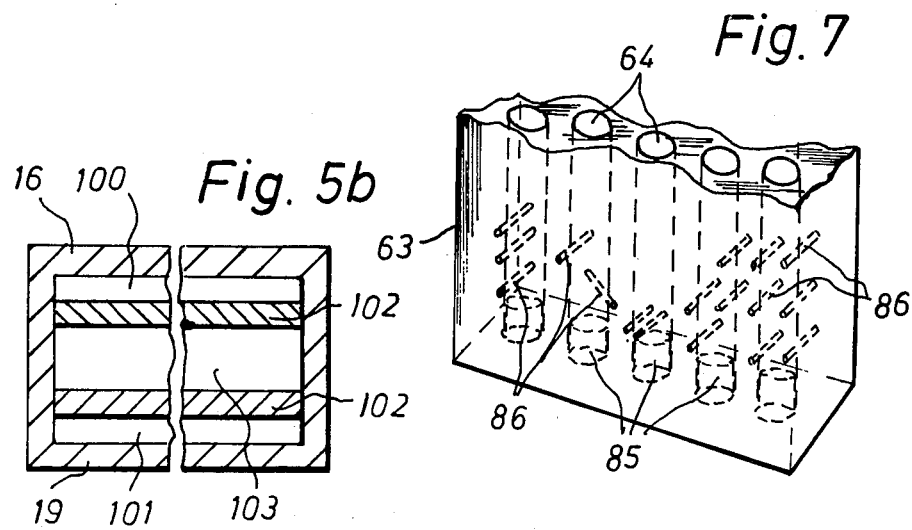

4,207,065

DEVICE FOR HEATING OPEN MELTING BATHS, SUCH AS GALVANIZING BATHS, ENAMELING BATHS, LEAD COATING BATHS, METALLIC BATHS, GLASS BATHS, AND THE LIKE

The present invention relates to a device for heating open melting baths, such as galvanizing baths, enameling baths, lead coating baths, metallic baths, glass baths, and the like in tubs, or vats or tanks.

U.S. Pat. No. 3,897,202 of Achermann et al discloses a device for heating open melting baths, such as galvanizing baths, enameling baths, lead coating baths, metallic baths, glass baths, and the like in tubs, or vats or tanks. An inert gas is circulated through components of the open bath which are closed towards the gas side, and through the heater. The tub, or vat or tank, includes at each longitudinal and/or end wall a plurality of conduit means, such as pipes, for introducing the gas into the bath. The gas is withdrawn above the conduit means through a draft flue at the edge of the tub, or vat or tank, which draft flue includes a vertical partition immersed in the bath.

Some of the aforementioned baths, for example, galvanizing baths, increase, on increase of the pertaining temperatures, in aggressiveness or attack on the metal parts immersed in the bath, in a way that the useful life of the immersed metal parts is shortened to an uneconomical extent.

It is an object of the present invention to provide a device for heating melting baths whereby introduction of the inert gas is carried out in such a way that the useful life of the parts or components immersed in the bath is appreciably increased.

In this context it is important to ensure that the inert gas is introduced into the bath at a sufficient depth in order to provide the inert gas, bubbling through the melting bath, with a lengthy heat exchanging path in the pertaining fluid or liquid of the bath. On the other hand, it is to be considered that the device of the present invention is based on the air-lift pump principle, i.e., is based on introduction of a gas into the pertaining liquid of the bath, in order to form the regions of the bath which are dispersed with gas bubbles with a lesser specific density, so as to render them floatable, whereby a circulating pattern in bath sections is achieved, without assistance by a mechanical agitating means. For this purpose, again, deep penetration of the gas is of advantage. Furthermore, it has to be considered that the fluid or liquid of the bath, usually having a high specific density, is actively in motion, particularly at the locations at which the gas is introduced into, and bubbling through, the pertaining fluid of the bath.

This object and other objects and advantages of the invention will appear more clearly from the following specification in connection with the accompanying drawings, in which:

FIG. 3 is a diagrammatical representation of an embodiment including a single ceramic block with a pertaining distribution box or box-like headpiece for the inert gas;

Figure 1:
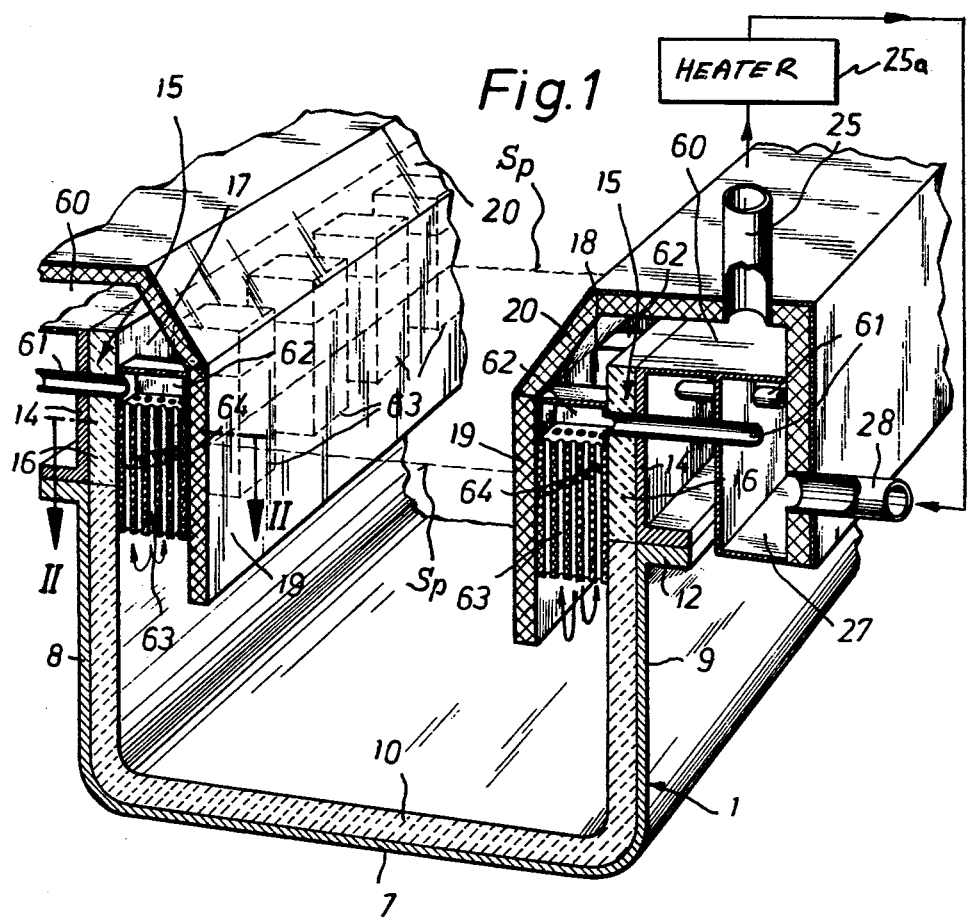
FIG. 1 is a diagrammatical representation, in perspective, of a vat, or tank or tub, partially shown in cross-section in accordance with one embodiment of the invention.

FIG. 4 diagrammatically indicates another embodiment including a plurality of ceramic blocks with a pertaining distribution box;

FIGS. 5, 5a and 5b indicate three embodiments of a block with a longitudinal slot;

FIG. 6 indicates an embodiment of a ceramic block having a plurality of exit openings;

FIG. 7 indicates an embodiment of a ceramic block with foot end ribs or slanted sections; and FIG. 8 indicates an embodiment of a ceramic block having a plurality of lateral exit openings.

The device according to the present invention is characterized primarily in that the means for introduction of the inert gas into the pertaining fluid of the bath include at least one ceramic block and passage means, e.g. bores or tubes, in a bundled manner. Between the outer walls of a ceramic block and adjacent blocks, or the vertical wall of a cooled gas collecting means or draft flue, and/or the wall of the container, tub, or vat or tank, there is provided a sufficient space for the rising and falling, circulating fluid of the bath.

According to a preferred embodiment of the invention, passage means are either provided in a unitary block, or in blocks forming a unitary structure.

According to another embodiment of the invention, the blocks are embedded with pertaining sides in the lining of oppositely arranged walls of an upright partition and a pertaining wall of the container for the bath.

The bores in a block can be arranged in a manner such that one or several, parallel, rows of bores are provided in a block.

In a preferred embodiment, the end of the block rising above the pertaining fluid of the bath can support a box-like headpiece, with the openings of parallel longitudinal bores or ducts of the block leading thereinto, as does a feed conduit or pipe for the inert gas. In accordance with a very simple embodiment, the headpiece can be in the form of a metal box-structure which is gas-tight connected to the block, with free side side walls of the metal box-structure, as required, being covered with ceramic plates, in order to protect the box against splashing of hot liquid of the pertaining bath, particularly because the bubbling inert gas leaves the pertaining bath near these side walls.

According to another embodiment of the invention, the lower portion or section of the ceramic block is provided with bores which divide the gas stream passing therethrough. For this, the lower end of the pertaining passages or bores can be closed and the lateral walls can be provided with holes communicating the pertaining passages with the bath. Furthermore, the gas conducting passages in the block can be closed by means of ceramic sieves or screens for dividing of the gas stream being passed through the block.

In accordance with another embodiment, the block can include a longitudinal slot which may be divided by partitions.

In accordance with yet another embodiment, the blocks of the means for introduction of the inert gas define a gas conducting slot or passage with an upright partition or wall.

Referring now particularly to the drawings, FIG. 1 shows a container, designated by the numeral 1, such as a tub, or vat or tank, for galvanizing of a web-shaped metal band in a suitable bath. The container includes a bottom wall 7 and two side walls 8 and 9 which are lined with a lining 10. Flange portions 12 of the walls 8 and 9 receive the metallic part 14 of a headpiece 15 provided with a lining 16. The parts 7 to 10 and the headpiece 15 form an upwardly open tub, or vat or tank, whereby the headpiece 15 and/or upper section of the walls 8 and 9 form the tank or tub edge or rim.

Figures 2, 2A, 2B:
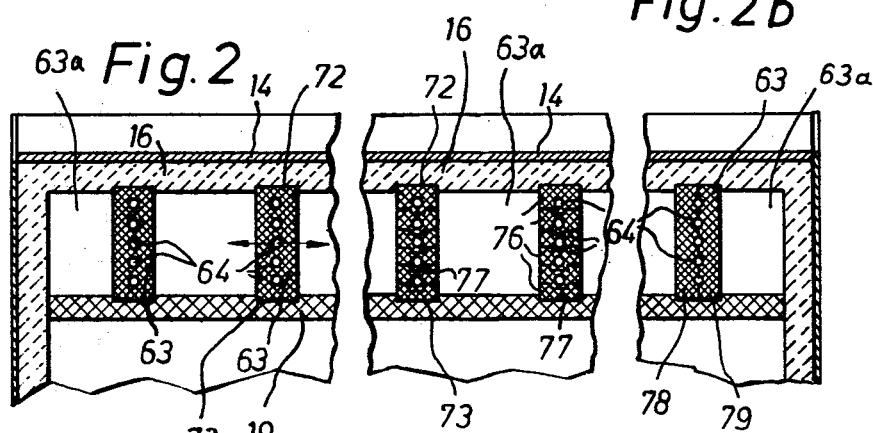
FIGS. 2, 2a and 2b show various embodiments of the section taken along line II—II in FIG. 1.

To the sides and above the head pieces 15 there are formed, at the longitudinal sides of the tub, or vat or tank, respectively, vertical ducts, compartments or shafts 17 and 18, each being bounded toward the center of the container by walls 19 and 20 and extending horizontally, as indicated at 60, to form part of a cooled gas receiving means. A withdrawal conduit 25 for the inert gas communicates with the horizontal section 60 and provides for communication with a heater 25a in which the collected, cooled inert gas is heated to the pertaining temperature of use. Upon heating, the heated or warm inert gas is passed through inlet conduit 28 into a distributor channel 27. The distributor channel 27 and conduits 61 form part of a warm gas receiving means, with the conduits 61 leading to box-like headpieces 62. Ceramic blocks 63 are perpendicularly disposed beneath the headpieces 62. The headpieces 62 and the blocks 63, for example as indicated in FIGS. 1, 2 and 2a, extend transversely to the longitudinal axis of the container, at a distance from each other, in the vertical section of the compartments 17 and 18, whereby spaces, designated by the numeral 63a, are provided therebetween (FIGS. 2, 2a and 2b). The fluid of the bath can circulate in the respective spaces 63a due to the airlift pump principle of the unit. The ceramic blocks 63 comprise one or several, parallel, vertical rows of bores or passages 64, which extend from the upper end face 65 to the lower end face 66 (FIG. 3) of a pertaining block 63, for passage of the inert gas therethrough into the fluid of the pertaining bath.

The box-like headpiece 62 can have a length which corresponds to the width of the block 63, while the width b (FIG. 3) of the headpiece 62 is somewhat less than the width c (FIG. 3) of the block 63, so that the side walls 67 and 68 of the metal box-like headpiece 62 can be provided exteriorly with ceramic plates 69, the outer surfaces of which are in line with the side walls 70 and 71 of the block 63 (FIG. 3).

The ceramic blocks 63, which can also be provided by other materials resistant to the fluid of the bath in the container 1, are inserted with the transverse side wall portions 72 and 73 (FIG. 2, FIG. 2a) in corresponding grooves in the lining 16 and the wall 19, respectively, to be held in place and secured against floating.

As indicated in FIG. 2a, the blocks 63 can be composed of several individual block sections, indicated by the numeral 76, which block sections 76 are in the form of conduits, ducts or tubes with a generally rectangular or square outer configuration. In the embodiment indicated in FIG. 2a, the individual tubes or conduits, gathered into a block-like tube or conduit bundle, are joined in transverse direction to the vertical portion of the compartments or shafts 17 and 18, whereby adjacent side parts of the block sections 76 are joned to each other, for example, by means of a tongue and groove joint 77.

In the embodiment indicated in FIG. 2b, a block 63 is comprised of two portions 78 and 79, whereby the separating plane extends transversely to the longitudinal direction of the container. The portions 78 and 79 are also joined, for example, in a manner as indicated in FIG. 2a, to be in close, sealing contact with each other.

FIG. 4 provides a perspective view of a block 63 composed of individual ceramic block sections 80, each section including a vertical bore for passage of the pertaining gas therethrough. Such a block has a high stability and, accordingly, can extend deep into the bath, the fluid of which is moved in the vertical section of the shafts or compartments 17 and 18 by the introduced gas. The fluid level "Sp" can extend close to the box-like headpiece 62. According to the embodiment of FIG. 4, the box-like headpiece 62 can also include a ceramic cover on pertaining side walls and, as required, on exposed upper and lower surfaces.

Instead of the transverse arrangement of blocks 63, these can also be disposed in the longitudinal direction in the shafts or compartments 17 and 18. Analogously, from end wall 90 to the opposite end wall 91 of the shafts or compartments 17 and 18, there extend two ceramic plates 93 and 94 (FIGS. 5 and 5a) which are spaced apart to leave a gap 92. The gap 92 leads with its upper end into a corresponding distribution box, not shown, similar to the headpiece 62, while its lower end communicates with the melting bath. In the embodiment according to FIG. 5, the gap 92 is subdivided, in the longitudinal direction, by vertical ribs 95 which define small shafts or vertical compartments 96, whereby the ribs 95 form part of one of the two ceramic plates, i.e., plate 93 in the embodiment shown.

In FIG. 6 a ceramic block 63 is shown having a box-like headpiece 62. While the upper ends of the bores 64 extend in full through the face wall 65, the lower end wall of the block 63, according to FIG. 6, includes a ceramic plate 82 which is provided with coaxially extending small through-bores 83 which disperse the gas passing through bores 64 in the direction indicated by arrows 84 so as to bubble the gas through the bath, the bubbles rising along the free walls of the block 63 in the melting bath. Instead of a ceramic plate 82, individual plates can be inserted in the lowermost opening of the pertaining bores 64, which plates are provided with suitable through-bores.

In the embodiment according to FIG. 7, the bores 64 are closed by plug-like ceramic closures 85 with lateral holes 86 being provided at a distance above the closures 85 to communicate the bores 64 with the melting bath.

In the embodiment according to FIG. 5b, two parallel slots 100, 101 are provided for introduction of the inert gas into the pertaining bath. The slots are defined respectively by the parallel walls 102 adjacent the lining 16 and the wall 19, which latter may also include a lining, with the walls 102 extending preferably parallel to the adjacent linings, with a passage, slot or duct 103 being formed between the walls 102 having a width which is preferably twice the width of the slots 100 and 101, through which passage, slot or duct 103 the inert gas bubbles in upward direction to be withdrawn at the upper end thereof towards the heater 25a.

In order to achieve an intensive bubbling of gas through the fluid of the pertaining bath in the shafts or compartments 17 and 18, the lower end 163 (FIG. 8) of a ceramic block can be provided with a longitudinal rib or flared portion 165 which rises from the outer surface wall 164. The gas stream passing in the direction indicated by the arrows "P" along the flared portion 165 is disrupted and divided into bubbles at a distance away from the wall 164 and 164a, respectively, when a second, mirror-image, flared portion 165a is provided on the second outer surface wall 164a.

The invention provides the advantage that despite the use of ceramic material for the blocks including or defining the gas passage means, a high immersion depth is obtained into the melting bath having a high specific gravity and a moving fluid, so that an increase of the useful life of the parts immersed into the bath is attainable and, thereby, achieving transfer of the inert gas into the melting bath.

The present invention is, of course, in no way restricted to the specific disclosure of the specification and drawings, but also encompasses any modifications within the scope of the appended claims.

What we claim is:

1. A device for heating open melting baths, especially galvanizing baths, enameling baths, lead coating baths, metal baths, and glass baths, which comprises:

a container having walls and adapted to receive a melting bath;

warm gas receiving means arranged at least partially within said container for communication therewith;

first conduit means leading into said warm gas receiving means for conveying an inert gas thereto;

means for communicating said warm gas receiving means with said container, said means comprising at least one ceramic block each including passage means for communicating said warm gas receiving means with said container;

a heater in communication with said first conduit means;

cooled gas collecting means also arranged partially within said container for receiving cooled gas from said container; and second conduit means for communicating said cooled gas collecting means with said heater.

2. A device according to claim 1, wherein said at least one ceramic block includes a unitary block.

3. A device according to claim 1, wherein said at least one ceramic block includes a block comprised of block-forming sections.

4. A device according to claim 1, wherein said means for communicating said warm gas receiving means with said container further comprises an upright partition arranged within said container, said at least one ceramic block being operatively securable in a pertaining wall of said container and said upright partition.

5. A device according to claim 1, wherein said passage means in said at least one ceramic block includes parallel rows of bores.

6. A device according to claim 1, wherein said means for communicating said warm gas receiving means with said container includes a box-like headpiece interposed between said at least one ceramic block and said warm gas receiving means and communicating with both.

7. A device according to claim 6, wherein said box-like headpiece includes a metal box-like structure gas-tight connectible to said at least one ceramic block, said structure being covered exteriorly with a protective ceramic cover.

8. A device according to claim 1, wherein that portion of said passage means which communicates with said container includes means for dispersing a gas into said container in divided form.

9. A device according to claim 1, wherein said passage means includes first and second passage means, said first passage means extending longitudinally and in communication with said gas receiving means, said second passage means extending at an angle to said first passage means and communicating said first passage means and said container.

10. A device according to claim 8, wherein said means for dispersing a gas comprises ceramic screen means.

11. A device according to claim 1, wherein said passage means comprises a slot-shaped passage.

12. A device according to claim 11, wherein said slot-shaped passage includes ribs for subdividing said slot-shaped passage.

13. A device according to claim 1, wherein said means for communicating said warm gas receiving means with said container includes an upright partition arranged in said container parallel to a pertaining wall of said container, each of said ceramic blocks defining said passage means between said block and at least one of said pertaining wall and said upright partition.

14. A device according to claim 13, including two ceramic blocks, one adjacent a pertaining wall of said container and one adjacent said upright partition, said two ceramic blocks being spaced apart to form a duct for communication with said cooled gas collecting means.

15. A device according to claim 13, wherein at least one of said walls of said container and said upright partition includes a corrosion resistant lining.

16. A device according to claim 1, wherein said at least one ceramic block includes at least one outwardly directed flared portion at that end of a pertaining block which is directed towards said container for dispersal of a gas in divided form.

* * * * *